(12) United States Patent
Ritt et al.

(10) Patent No.: US 6,937,751 B2
(45) Date of Patent: Aug. 30, 2005

(54) SYSTEM AND METHOD FOR ALIGNING IMAGES

(75) Inventors: Daniel M. Ritt, Colorado Springs, CO (US); Matthew L. Whitaker, Colorado Springs, CO (US)

(73) Assignee: Radiological Imaging Technology, Inc., Colorado Springs, CO (US)

( * ) Notice: Subject to any disclaimer, the term of this patent is extended or adjusted under 35 U.S.C. 154(b) by 123 days.

(21) Appl. No.: 10/630,015

(22) Filed: Jul. 30, 2003

(65) Prior Publication Data

US 2005/0025386 A1 Feb. 3, 2005

(51) Int. Cl.$^7$ ............................. G06K 9/00; G06K 9/32; G06K 9/62
(52) U.S. Cl. ....................... 382/132; 382/294; 382/209
(58) Field of Search .................... 382/128, 132, 382/141, 175, 181, 203, 209, 217, 276, 278, 294

(56) References Cited

U.S. PATENT DOCUMENTS

| | | | | |
|---|---|---|---|---|
| 5,696,835 A | * | 12/1997 | Hennessey et al. | 382/141 |
| 5,926,568 A | * | 7/1999 | Chaney et al. | 382/217 |
| 6,351,573 B1 | * | 2/2002 | Schneider | 382/294 |
| 6,351,660 B1 | * | 2/2002 | Burke et al. | 600/425 |
| 6,563,942 B2 | | 5/2003 | Takeo et al. | |
| 6,754,374 B1 | | 6/2004 | Miller et al. | |
| 6,839,454 B1 | * | 1/2005 | Park | 382/128 |
| 2002/0048393 A1 | | 4/2002 | Oosawa | |

OTHER PUBLICATIONS

J.M. Fitzpatrick, J.B. West, C.R. Manrer Jr., "Predicting Error in Rigid–Body Point Based Registration," IEEE Transactions on Medical Imaging, 17(5): 694–702, Oct. 1998.
ACR Bulletin, Apr. 2001, vol. 57, Issue 4, pp. 4–5, 10.

* cited by examiner

*Primary Examiner*—Andrew W. Johns
*Assistant Examiner*—Amir Alavi
(74) *Attorney, Agent, or Firm*—Rader, Fishman & Grauer PLLC

(57) ABSTRACT

The invention is a system or method for aligning images (the "system"). A definition subsystem, including a first image, a second image, one or more target reference points, one or more template reference points, and a geometrical object. The definition subsystem identifies one or more target reference points associated with the first image and one or more template reference points associated with the second image by providing a geometrical object for positioning the first image in relation to the second image. A combination subsystem is configured to generate an aligned image from the first image and second image. An interface subsystem may be used to facilitate interactions between a user and the system.

49 Claims, 10 Drawing Sheets

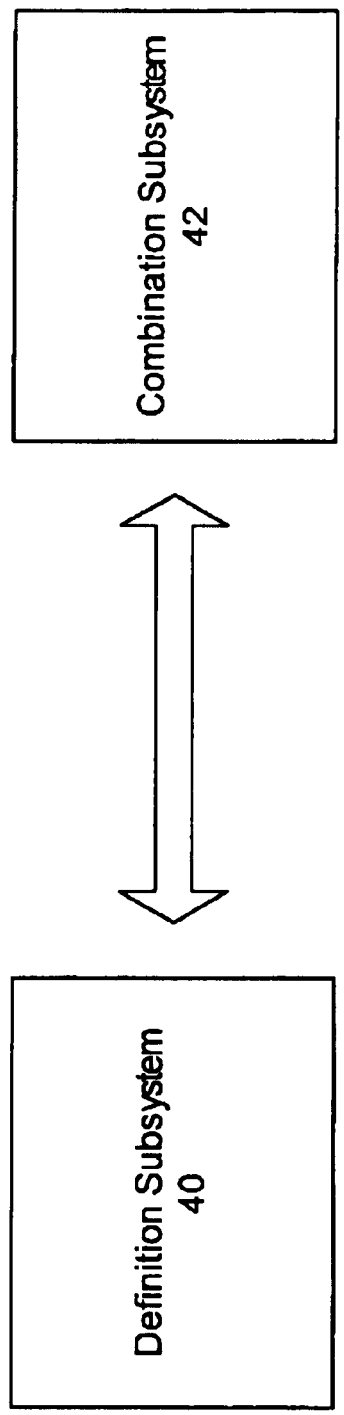

SYSTEM AND METHOD FOR ALIGNING IMAGES

BACKGROUND OF THE INVENTION

The present invention relates in general to the alignment of images. More specifically, the present invention relates to a system or method for aligning two or more images (collectively "alignment system" or simply the "system").

Image processing often requires that two or more images from the same source or from different sources be "registered," or aligned, so that they can occupy the same image space. Once properly aligned to the same image space, images can then be compared or combined to form a multidimensional image. Image alignment can be useful in many applications. One such possible application is in medical imaging. For example, an image produced by magnetic resonance imaging ("MRI") and an image produced by computerized axial tomography ("CAT" or "CT") originate from different sources. When the images are overlaid, information acquired in relation to soft tissue (MRI) and hard tissue (CT) can be combined to more accurately depict an area of the body. The total value of the combined integrated image can exceed the sum of its parts.

Another possible application of image alignment is for quality assurance measurements. For example, radiation oncology often requires image treatment plans to be compared to quality assurance films to determine if the treatment plan is actually being executed. There are also numerous non-medical applications for which image alignment can be very useful.

Several methods are available for image alignment, including automated and manual alignment methods. However, currently available image alignment tools and techniques are inadequate. In many instances, computer automated methods are unsuccessful in aligning images because boundaries are not well defined and images can be poorly focused. Although automated alignment methods perform alignment activities more quickly than existing manual alignment methods, manual alignment methods are often more accurate than automated methods. Thus, manual image alignment methods are often used to make up for deficiencies and inaccuracies of automated alignment methods. However, existing manual alignment systems and methods can be tedious, time consuming, and error prone. It would be desirable for an alignment system to perform in an efficient, accurate, and automated manner.

SUMMARY OF THE INVENTION

The invention is a system or method for aligning images (the "system"). A definition subsystem, including a first image, a second image, one or more target reference points, one or more template reference points, and a geometrical object. The definition subsystem identifies one or more target reference points associated with the first image and one or more template reference points associated with the second image by providing a geometrical object for positioning the first image in relation to the second image. A combination subsystem is configured to generate an aligned image from the first image and second image. An interface subsystem may be used to facilitate interactions between users and the system.

The alignment system can be applied to images involving two, three, or more dimensions. In some embodiments, an Affine transform heuristic is performed using various target and template points. The Affine transform can eliminate shift, rotational, and magnification differences between different images. In other embodiments, different types of combination heuristics may be used.

BRIEF DESCRIPTION OF THE DRAWINGS

Certain embodiments of present invention will now be described, by way of examples, with reference to the accompanying drawings, in which:

FIG. 2A is a subsystem-level block diagram illustrating an example of a definition subsystem and a combination subsystem.

DETAILED DESCRIPTION

I. Introduction of Elements and Definitions

The present invention relates generally to methods and systems for aligning images (collectively an "image alignment system" or "the system") by producing an aligned image from a number of images and a relationship between various reference points associated with those images. A geometrical object can be formed from selected reference points in one image, copied or transferred to a second image, and positioned within that second image to establish a relationship between reference points.

Figure 1:
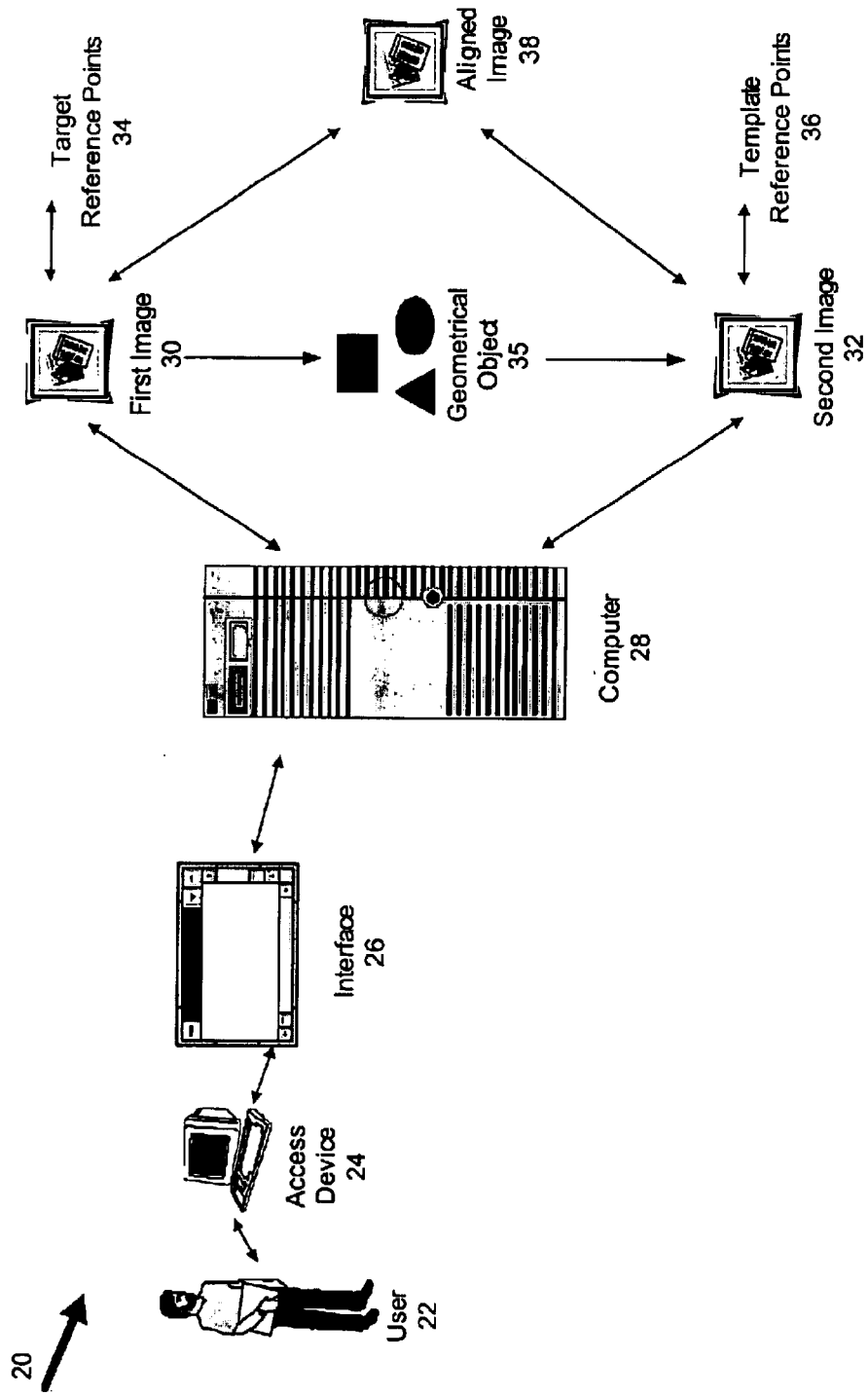
FIG. 1 is an environmental block diagram illustrating an example of an image alignment system accessible by a user.

The system can be used in a wide variety of different contexts, including medical applications, photography, geology, and any other field that involves the use of images. The system can be implemented in a wide variety of different devices and hardware configurations. A wide variety of different interfaces, software applications, operating systems, computer hardware, and peripheral components may be incorporated into or interface with the system. There are numerous combinations and environments that can utilize one or more different embodiments of the system. Referring now to the drawings, FIG. 1 is a block diagram illustrating an example of some of the elements that can be incorporated into an image alignment system 20. For illustrative purposes only, FIG. 1 shows a human being to represent a user 22, a computer terminal to represent an access device 24, a GUI to represent an interface 26, and a computer tower to represent a computer 28.

A. User

A user 22 can access the system 20 through an access device 24. In many embodiments of the system 20, the user 22 is a human being. In some embodiments of the system 20, the user 22 may be an automated agent, a robot, a neural network, an expert system, an artificial technology device, or some other form of intelligence technology (collectively "intelligence technology"). The system 20 can be implemented in many different ways, giving users 22 a potentially wide variety of different ways to configure the processing performed by the system 20.

B. Access Device

The user 22 accesses the system 20 through the access device 24. The access device 24 can be any device that is either: (a) capable of performing the programming logic of the system 20; or (b) communicating a device that is capable of performing the programming logic of the system 20. Access devices 24 can include desktop computers, laptop computers, mainframe computers, mini-computers, programmable logic devices, embedded computers, hardware devices capable of performing the processing required by the system 20, cell phones, satellite pagers, personal data assistants ("PDAs"), and a wide range of future devices that may not yet currently exist. The access device 24 can also include various peripherals associated with the device such as a terminal, keyboard, mouse, screen, printer, input device, output device, or any other apparatus that can relay data or commands between a user 22 and an interface 26.

C. Interface

The user 22 uses the access device 24 to interact with an interface 26. In an Internet embodiment of the system 20, the interface 26 is typically web page that is viewable from a browser in the access device 22. In other embodiments, the interface 26 is likely to be influenced by the operating system and other characteristics of the access device 24. Users 22 can view system 20 outputs through the interface 26, and users 22 can also provide system 20 inputs by interacting with the interface 26.

In many embodiments, the interface 26 can be describe as a combination of the various information technology layers relevant to communications between various software applications and the user 22. For example, the interface 26 can be the aggregate characteristics of a graphical user interface ("GUI"), an intranet, an extranet, the Internet, a local area network ("LAN"), a wide area network ("WAN"), a software application, other type of network, and any other factor relating to the relaying of data or commands between an access device 24 and a computer 28, or between a user 22 and a computer 28.

D. Computer

A computer 28 is any device or combination of devices that allows the processing of the system 20 to be performed. The computer 28 may be a general purpose computer capable of running a wide variety of different software applications or a specialized device limited to particular functions. In some embodiments, the computer 28 is the same device as the access device 24. In other embodiments, the computer 28 is a network of computers 28 accessed by the accessed device 24. The system 20 can incorporate a wide variety of different information technology architectures. The computer 28 is able to receive, incorporate, store, and process information that may relate to operation of the image alignment system 20. The computer 28 may include any type, number, form, or configuration of processors, system memory, computer-readable mediums, peripheral devices, and operating systems. In many embodiments, the computer 28 is a server and the access device 24 is a client device accessing the server.

Many of the processing elements of the system 20 exist as representations within the computer 28. Images to be aligned by the system 20, such as a first image 30 and a second image 32, are examples of processing elements existing as representations within the computer 28. An image may include various reference points, and those reference points can exist as representations within the computer 28. A geometrical object 35 of reference point(s) that is used to align a first image 30 with respect to a second image 32, also exist as representations within the computer 28.

E. Images

The images 30 and 32 can be any representation that can be read or acted upon by the computer 28, including graphical or data representations. The representations can involve two-dimensional, three-dimensional, or even greater than three-dimensional information. One or more of the images may be a digital image. An aligned image 38 can be formed from any number of images.

An image is potentially any visual representation that can potentially be aligned with one or more other visual representations. In many embodiments, images are captured through the use of a light-based sensor, such as a camera. In other embodiments, images can be generated from non-light based sensors or the sources of information and data. An ultrasound image is an example of an image that is generated from a non-light based sensor.

The images processed by the system 20 are preferably digital images. In some embodiments, the images are initially captured in a digital format and are passed unmodified to the system 20. In other embodiments, digital images may be generated from analog images. Various enhancement heuristics may be applied to an image before it is aligned by the system 20, but the system 20 does not require the performance of such pre-alignment enhancement processing.

The computer 28 may act upon multiple images in myriad ways, including the execution of commands or instructions that are provided by the user 22 of the system 20. For example, the computer 28 can receive input from the user 22 through the interface 26 and from a first image 30 (a "target" image), a second image 32 (a "template image"), target reference points 34, a geometrical object 35, and template reference points 36 generate an aligned image 38.

F. Reference Points

A reference point is a location on an image that is used by the system 20 to align the image with another image. Reference points may be as small as an individual pixel, or a large constellation of pixels. In a preferred embodiment, the user 22 identifies the reference points and the system 20 generates the aligned image 38 from the reference points in an automated fashion without further user 22 intervention.

As seen in FIG. 1, target reference points 34 are associated with the first image 30 (the "target image") and template reference points 36 are associated with a second image 32 (the "template image"). Any number of target images can be aligned with respect to a single template image. The target reference points 34 and template reference points 36 are locations in relation to an image, and the system 20 uses the locations of the target reference points 34 and the template reference points 36 to determine a relationship so that an aligned 38 can be generated. Locations of the template reference points 36 may be determined by positioning the geometrical object 35 within the second image 32. Thus, the geometrical object 35 can be used to facilitate a generation of an aligned image 38. In the embodiment shown in FIG. 1, a geometrical object 35 is transmitted or copied from a first image 30 to a second image 32. In alternative embodiments, the geometrical object 35 may be reproduced in the second image 32 in some other way.

G. Geometrical Object

The geometrical object 35 is the configuration of target reference point(s) 34 within the target image 30 that are used to align the target image 30 with the template image 32. In a preferred embodiment, the geometrical object 35 is made up at least three points.

II. Subsystem-Level Views

The system 20 can be implemented in the form of various subsystems. A wide variety of different subsystem configurations can be incorporated into the system 20.

Figure 2B:
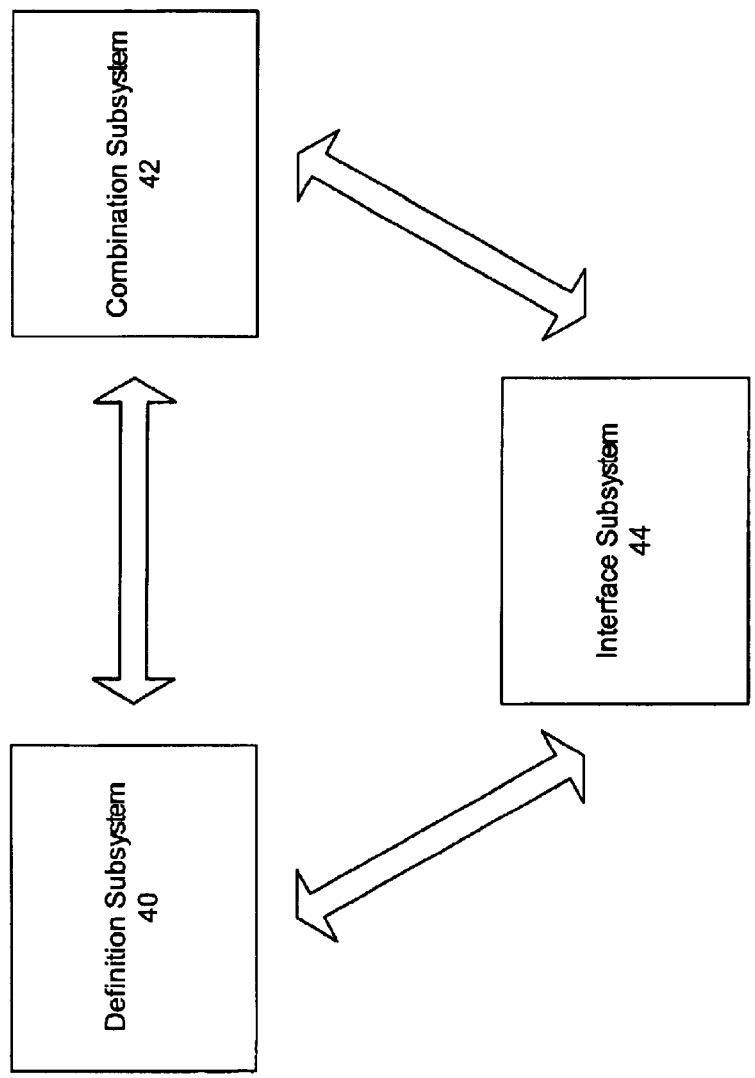
FIG. 2B is a subsystem-level block diagram illustrating an example of a definition subsystem, a combination subsystem, and an interface subsystem.
Figure 2C:
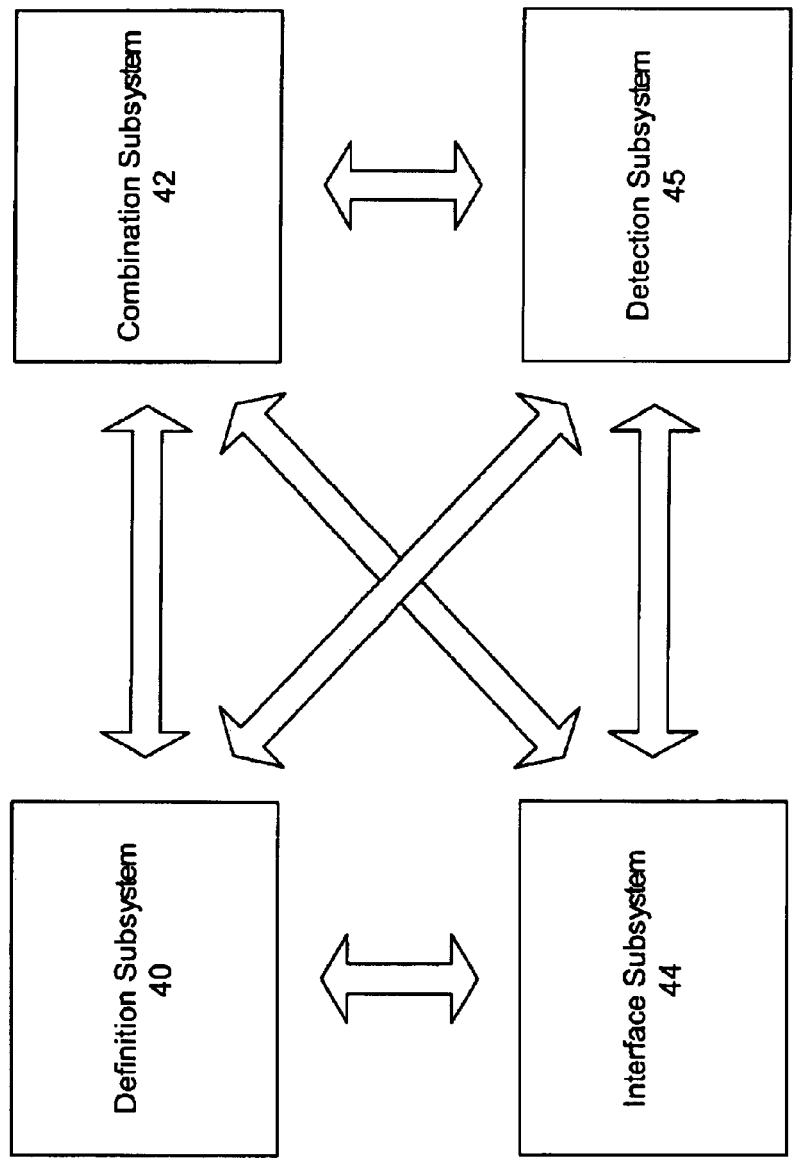
FIG. 2C is a subsystem-level block diagram illustrating an example of a definition subsystem, a combination subsystem, an interface subsystem, and a detection subsystem.

FIGS. 2A, 2B, and 2C illustrate different subsystem-level configurations of the system 20. FIG. 2A shows a system 20 made up of two subsystems: a definition subsystem 40 and a combination subsystem 42. FIG. 2B illustrates a system 20 made up of three subsystems: the definition subsystem 40, the combination subsystem 42, and an interface subsystem 44. FIG. 2C displays an association of a four subsystems: the definition subsystem 40, the combination subsystem 42, the interface subsystem 44, and a detection subsystem 45. Interaction between subsystems 40-44 can include an exchange of data, algorithms, instructions, commands, locations of points in relation to images, or any other communication helpful for implementation of the system 20.

A. Definition Subsystem

The definition subsystem 40 allows the system 20 to define the relationship(s) between the first image 30 and the second image 32 so that the combination subsystem 42 can create the aligned image 38 from the first image 30 and the second image 32.

The processing elements of the definition subsystem 40 can include the first image 30, the second image 32, the target reference points 34, the template reference points 36, and the geometrical object 35. The target reference points 34 are associated with the first image 34, and the template reference points 36 are associated with the second image 32. The target reference points 34 may be selected through an interface subsystem 44 or by any other method readable to the definition subsystem 40. The definition subsystem 40 is configured to define or create the geometrical object 35.

In one embodiment, the definition subsystem 40 generates the geometrical object 35 by connecting at least the subset of target reference points 34. The definition subsystem 40 may further identify a centroid of the geometrical object 35. In addition, the definition subsystem 40 may impose a constraint upon one or more target reference points 34. Constraints may be purely user defined on a case-by-case basis, or may be created by the system 20 through the implementation of user-defined processing rules. By imposing the constraint upon one or more target reference points 34, the definition subsystem 40 can ensure that the target reference points 34 are adequate for generation of the geometrical object 35. The definition subsystem 40 can impose any number, combination, or type of constraint. These restraints may include a requirement that a minimum number of target reference points 34 be identified, that a minimum number of target reference points 34 not be co-linear, or that target reference points 34 be within or outside of a specified area of an image.

The definition subsystem 40 generates the geometrical object 35 and coordinates the geometrical object 35 with the second image 32, which generation and coordination can be accomplished by any method known to a person skilled in the art, including by transferring or copying the geometrical object 35 to the second image 32. The definition subsystem 40 can provide a plurality of controls for positioning the geometrical object 35 within the second image 32. The controls may include any one of or any combination of a control for shifting the geometrical object 35 along a dimensional axis, a control for rotating the geometrical object 35, a control for changing a magnification of the geometrical object 35, a course position control, a fine position control, or any other control helpful for a positioning of the geometrical object 35 in relation to the second image 32.

The definition subsystem 40 can include a thumbnail image of the geometrical object 35. In some embodiments, the definition subsystem 40 can identify a plurality of positions of the geometrical object 35 in relation to the second image 32. Those positions may include a gross position and a fine position. The thumbnail image may be used to identify gross or fine positions of the geometrical object 35 in relation to the second image 32. The definition subsystem 40 can identify a plurality of positions of the geometrical object in a substantially similar and consistent manner. In some embodiments, the definition subsystem 40 adjusts the geometrical object 35 within the second image 32. The definition subsystem 40 may adjust a positioning of the geometrical object 35 within the second image 32.

The geometrical object 35 can be used to define template reference points 36. In one embodiment, vertices of the geometrical object 35 correspond with template reference points 36 when the geometrical object 35 is located within or about the second image 32. A positioning of the geometrical object 35 in relation to the second image 32 positions the vertices or other relevant points of the geometrical object 35 so as to define the template reference points 36. The definition subsystem 40 can provide for an accuracy metric related to at least one of the template reference points 36. The accuracy metric can identify a measurement of accuracy of a positioning of at least one of the template reference points 36 in relation to an estimated or predicted position of reference points within the second image 32.

The alignment system 20 can be applied to images involving two, three, or more dimensions. In some embodiments, an Affine transform heuristic is performed using various target reference points 34 and template points 36. The Affine transform can eliminate shift, rotational, and magnification differences between different images. In other embodiments, different types of relationship-related heuristics may be used by the definition subsystem 40 and/or the combination subsystem 42. Other examples of heuristics known in the art that relate to potential relationships between images and/or points include a linear conformal heuristic, a projective heuristic, a polynomial heuristic, a piecewise linear heuristic, and a locally weighted mean heuristic. The various relationship-related heuristics allow the system 20 to compare images and points that would otherwise not be in a format suitable for the establishment of a relationship between the various images and/or points. In other words, the relationship-related heuristics such as the Affine transform heuristic are used to "compare apples to apples and oranges to oranges."

B. Combination Subsystem

The combination subsystem 42 is responsible for creating the aligned image 38 from the images and relationships maintained in the definition subsystem 40. The combination subsystem 42 includes the aligned image 38. The combination subsystem 42 is configured to generate the aligned image 38 from the first image 30, the second image 32, at least one of the target reference points 34, and at least one of the template reference points 36. The generation of the aligned image 38 by the combination subsystem 42 can be accomplished in a number of ways. The combination subsystem 42 may access the target reference points 34 and the template reference points 36 from the definition subsystem 42. The combination subsystem 42 can generate an alignment calculation or determine a relationship between at least one of the target reference points 34 and at least one of the template reference points 36. The combination subsystem 42 can use an alignment calculation or relationship to align the first image 30 and the second image 32. In another embodiment, the combination subsystem 42 uses locations of the target reference points 34 and the template reference points 36 to generate the aligned image 38.

C. Interface Subsystem

An interface subsystem 44 can be included in the system 20 and configured to allow the system 20 to interact with users 22. Inputs may received by the system 20 from the user 22 through the interface subsystem 44, and users 22 may view the outputs of the system 20 through the interface subsystem 44. Any data, command, or other item understandable to the system 20 may be communicated to or from the interface subsystem 44. In a preferred embodiment, the user 22 can create processing rules through the interface subsystem 44 that can be applied to many different processing contexts in an ongoing basis. The interface subsystem 44 includes the interface 26 discussed above.

D. Detection Subsystem

A detection subsystem 45 can be configured to detect distortions, or other indications of a problem, relating to an aligned image 38. The detection subsystem 45 also allows a user 22 to check for distortions in an aligned image 38. Once a distortion has been detected, the detection subsystem 45 identifies the extent and nature of the distortion. The user 22 can use data provided by the detection subsystem 45 to check for a misalignment of a device or system that generated the first image 30 or the second image 32. The detection subsystem 45 can be configured by a user 22 through the use of the interface subsystem 44.

III. Input/Output View

Figure 3:
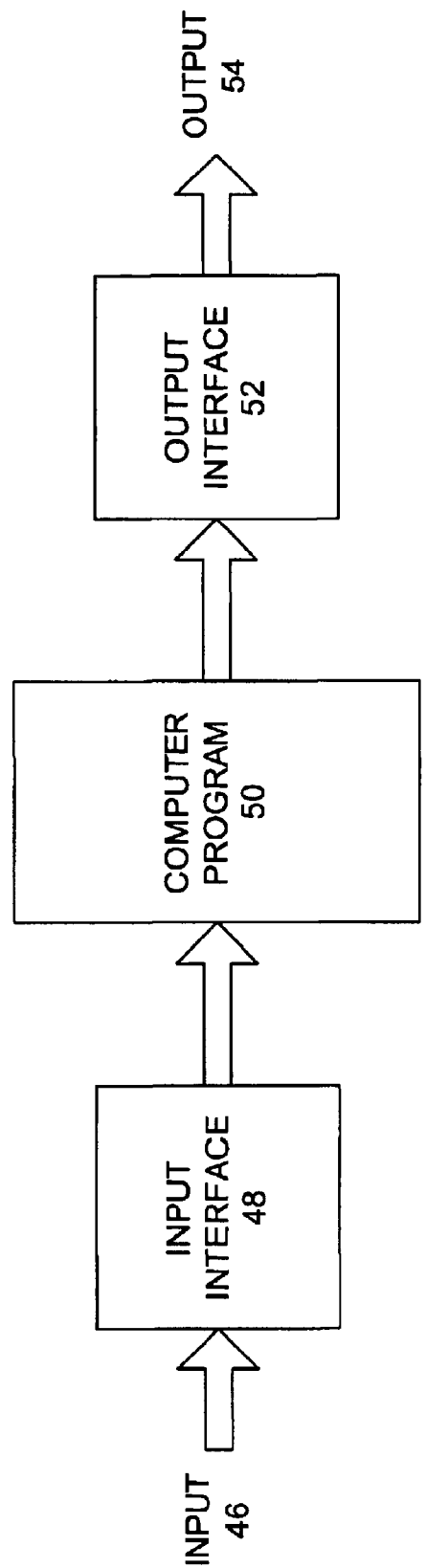
FIG. 3 is a flow diagram illustrating an example of how the system receives input and generates output.

FIG. 3 is a flow diagram illustrating an example of how the system receives input and generates output. A computer program 50 residing on a computer-readable medium receives user input 46 through an input interface 48 and provides output 54 to the user 22 through an output interface 52. The computer program 50 includes the target reference points 34, the geometrical shape 35; FIGS. 1–2, the first image 30, the second image 32, the template reference points 36, a third image, and the interface 26. As previously discussed, the target reference points 34 are associated with the first image 30. The computer program 50 can generate a geometrical object 35 or shape in a number of ways, including by connecting at least a subset of the target reference points 34. The geometrical shape 35 can be any number or combination of any shape, including but not limited to a segment, line, ellipse, arc, polygon, and triangle.

The input 46 may include a constraint imposed upon the target reference points 34 or the geometrical shape 35 by the computer program 50. By imposing a constraint upon target reference points 34, the computer program 50 ensures that the target reference points 34 are adequate for generation of the geometrical shape 35. The system 20 can impose any number, combination, or type of constraint, including a requirement that a minimum number of target reference points 34 be identified, that a minimum number of target reference points 34 not be co-linear, or that target reference points 34 be within or without an area. In one embodiment, the computer program 50 requires more than four target reference points 34. The computer program 50 may identify a centroid of the geometrical shape 35.

The second image 32 can be configured to include the geometrical shape 35. The geometrical shape 35 is generated by the computer program 50 within the second image 32. The computer program 50 can accomplish a generation of the geometrical shape 35 within the second image 32 in a number of ways. For example, the computer program 50 may transfer or copy the geometrical shape 35 from one image to another.

The computer program 50 provides for identifying the template reference points 36 or locations of the template reference points 36 in relation to the second image 32. In one embodiment, the template reference points 36 can be identified by a positioning of the geometrical shape 35 in relation to a second image 32, which positioning is provided for by the computer program 50. The computer program 50 provides for a number of controls for positioning the geometrical shape 35 within the second image 32. The manipulation of the controls is a form of input 46. The controls may include any one of or any combination of a shift control, a rotation control, a magnification control, a course position control, a fine position control, or any other control helpful for a positioning of the geometrical shape 35 in relation to a second image 32. The controls can function in a number of modes, including a coarse mode and a fine mode. The computer program 50 provides for positioning the geometrical shape 35 by shifting the geometrical shape 35 along a dimensional axis, rotating the geometrical shape 35, and changing a magnification of the geometrical shape 35. A positioning of the geometrical shape 35 can include a coarse adjustment and a fine adjustment. The computer program 50 is capable of identifying of plurality of positions of the geometrical shape 35 in relation to the second image 32, including a gross position and a fine position of the geometrical shape 35 in relation to the second image 32. This identification can be performed in a substantially simultaneous manner. A thumbnail image of an area adjacent to a vertex of the geometrical shape 35 can be provided by the computer program 50.

The computer program 50 can provide for an accuracy metric related to at least one of the template reference points 36. The accuracy metric is a form of output 54. The accuracy metric can identify a measurement of accuracy of a positioning of at least one of the template reference points 36 in relation to an estimated or predicted position of reference points within the second image 32.

The third image (the aligned image 38) is created from the first image 30, the second image 32, and a relationship between the target reference points 34 and the template reference points 36. The creation of the third image by the computer program 50 can be accomplished in a number of ways. The computer program 50 can generate an alignment calculation or determine a relationship between at least one of the target reference points 34 and at least one of the template reference points 36. The computer program 50 can use an alignment calculation or relationship to align the first image 30 and the second image 32. In another embodiment, the computer program 50 uses locations of the target reference points 34 and the template reference points 36 to generate the third image.

The computer program 50 can be configured to detect distortions of the third image. Once a distortion has been detected, the computer program 50 can identify the extent and nature of the distortion. A user 22 can use data generated by the computer program 50 to check for a misalignment of a device or system that generated the first image 30 or the second image 32. The output 54 of the computer program 50 can include various distortion metrics, misalignment metrics, and other forms of error metrics (collectively "accuracy metrics").

The interface 26 of the computer program 50 is configured to receive input. The interface 26 can include an input interface 48 and an output interface 52. The input can include but is not limited to an instruction for defining the target reference points 34 and a command for positioning the geometrical shape 35 in relation to the second image 32. The computer program 50 can be configured to execute other operations disclosed herein or known to a person skilled in the art that are relevant to the present invention.

IV. Process-Flow Views

A. EXAMPLE 1

Figure 4:
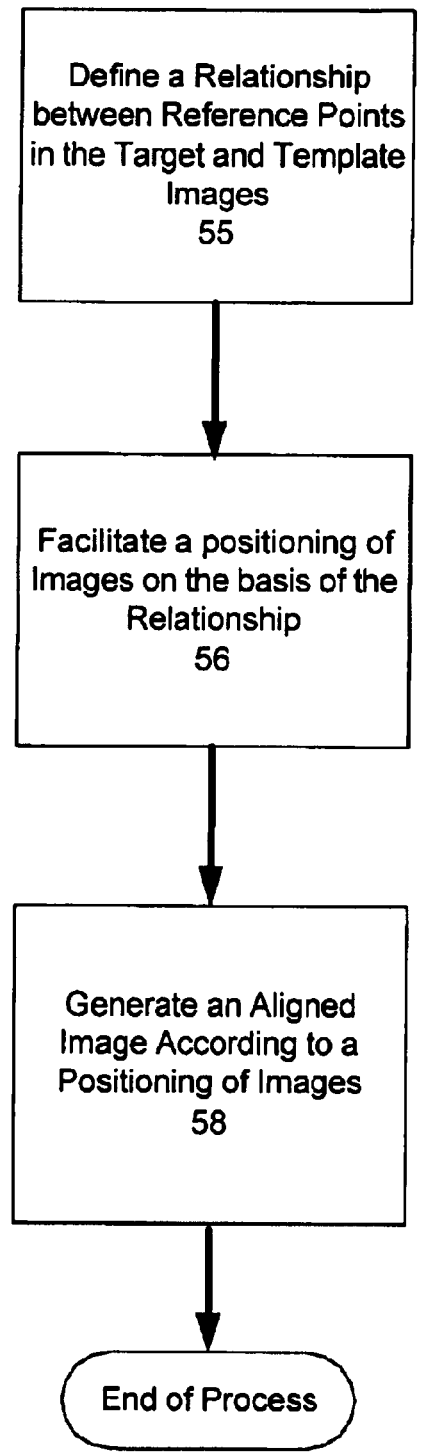
FIG. 4 is a flow diagram illustrating an example of facilitating a positioning of images and generating an aligned image according to the positioned images.

FIG. 4 is a flow diagram illustrating an example of facilitating a positioning of images and generating an aligned image according to the positioned images. At 56, a relationship is defined between the various images to be aligned. At 57, the system 20 facilitates the positioning of the images in accordance with the previously defined relationship. For example, the template image 32 is positioned in relation the target image 30 and the target image 30 is positioned in relation to the template image 32. At 58, the system generates the aligned image 38 in accordance with the positioning performed at 57.

The system 20 can perform the three steps identified above in a wide number of different ways. For example, the positioning of the images can be facilitated by providing controls for the positioning of the template image in relation to the object image.

B. EXAMPLE 2

Figure 5:
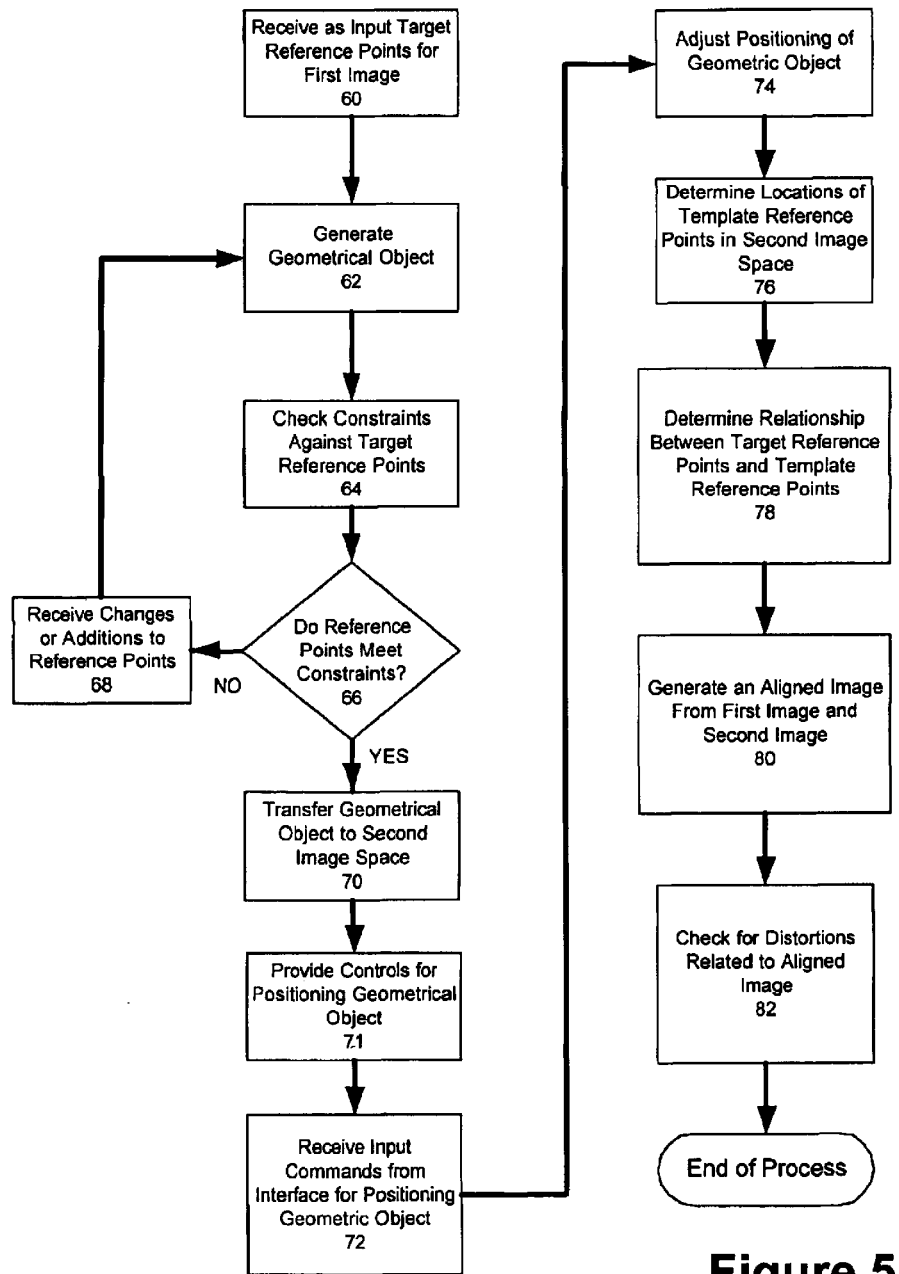
FIG. 5 is a flow diagram illustrating an example of steps that an image alignment system or method may execute to generate an aligned image.

FIG. 5 is a flow diagram illustrating an example of steps that an image alignment system 20 may execute to generate the aligned image 38.

At 60, the system 20 receives input for defining the target reference points 34 associated with a first image 30. Once the input 46 is received, or as it is received, the system 20 can then at 62 generate at the geometrical object 35. The input 46 may include a command. The geometrical object 35 can be generated in a variety of ways, such as by connecting the target reference points 34. In the preferred embodiment, the system 20 may be configured to require that at least four target reference points 34 be connected in generating the geometrical object 35. The geometrical object 35 can take any form or shape that connects the target reference points 34, and each target reference point 34 is a vertex or other defining feature of the geometrical object 35. In one category of embodiments, the geometrical object 35 is a polygon.

At 64, the system 20 imposes and checks a constraint against the target reference points 34. If the target reference points 34 at 66 do not meet constraints imposed by the system 20, the system 20 at 68 prompts and waits for input changing or adding to definitions of the target reference points 34. Once addition reference point data is received, the system 20 again generates a geometrical object 35 at 62 and checks constraints against the target reference points 34 at 64. The system 20 may repeat these steps until the target reference points 34 satisfy constraints. Any type of a constraint can be imposed upon the target reference points 34, including requiring enough target reference points 34 to define a particular form of geometrical object 35. For example, the system 20 may require that at least four target reference points 34 are defined. If more than two target reference points 34 are co-linear, the system 20 may require that additional target reference points 34 be defined. The system 20 may use the geometrical object 35 to impose constraints upon the target reference points 34.

Once the target reference points 34 are deemed at 66 to meet the constraints imposed by the system 20, the system 20 generates a geometrical object 35 within the first image 30 and regenerates the geometrical object 35 in the second image 32 space at 70. The geometrical object 35 can be generated in the second image 32 space in a number of ways, including transferring or copying the geometrical object 35 from the first image 30 to the second image 32. The geometrical object 35 can be represented by a set of connected points, a solid object, a semi-transparent object, a transparent object, or any other object that can be used to represent a geometrical object 35. Any such representation can be displayed by the system 20.

The system 20 identifies the template reference points 36 based on a placement of the geometrical object 35 in relation to the second image 32. In one embodiment, the method of identifying the template reference points is providing controls for positioning at 71 the geometrical object 35 in relation to the second image 32. A variety of controls can be made available, including one of or a combination of controls for shifting the geometrical object 35 up, down, left, or right in relation to the second image 32, rotating the geometrical object 35 in relation to the second image 32, changing the magnification or size of the geometrical object 35 in relation to the second image 32, moving the geometrical object 35 through multiple dimensions, switching between coarse and fine positioning of the geometrical object 35, or any other control that can be used to adjust the geometrical object 35 in relation to the second image 32. A command can be received as an input 46 allowing for the positioning of the geometrical object 35 by at least one of rotating the geometrical object 35, adjusting a magnification of the geometrical object 35, and shifting the geometrical object 35 along a dimensional axis. A command may allow for coarse and fine adjustments of the geometrical object 35.

In one embodiment, the system 20 provides a thumbnail image to the interface 26 for displaying an area proximate to at least one of the template reference points 36. The thumbnail image can be configured to allow for a substantially simultaneous display of fine positioning detail and coarse positioning detail, for example, by providing both a view of thumbnail images and a larger view of the geometrical object 35 in relation to the second image 32 to the user 22 for simultaneous viewing.

The system 20 may provide for an accuracy metric or an accuracy measurement detail for either a composite of the template reference points 36 or individually for at least one or more of the individual template reference points 36. The system 20 may provide accuracy metrics by calculating a number of accuracy metrics. Accuracy metrics facilitate an optimal positioning of the geometrical object 35 within the second image 32. In one embodiment, the system 20 receives input commands from an interface or from the user 22 for positioning the geometrical object 35 at 72 in relation to the second image 32. In one category of embodiments, the system 20 adjusts a positioning of the geometrical object 35 at 74 within the second image 32. This adjustment can be based upon the accuracy metric. The system 20 may use a computer implemented process, such as a refinement heuristic, or any other image alignment tool for adjusting a placement of the geometrical object 35 in relation to the second image 32.

In other embodiments, the locations of the template reference points 36 can be determined in other ways. For example, the user 22 may define the template reference points 36 by pointing and clicking on locations within the second image 32, or the template reference points 36 can be predefined. Once locations of the template reference points 36 have been determined, the system 20 can determine a relationship at 78 between the target reference points 34 and the template reference points 36. Such a relationship can be a mathematical relationship and can be determined in any of a number of ways.

The system 20 at 80 generates the aligned image 38 from the first image 30 and the second image 32. In one embodiment, the generation occurs by the system producing the aligned image 38 from the first image 30, the second image 32, and a relationship between at least one of the target reference points 34 in the first image 30 and at least one of the template reference points 36 in the second image 32. The system 20 can use an alignment calculation or a computer implemented combination heuristic to generate the aligned image 38. Some such heuristics are known in the prior art.

The system 20 can check at 82 for distortions of the aligned image 38. By checking for a distortion in the aligned image 38, the system 20 can detect a possible misalignment of a device used to generate the first image 30 or the second image 32. In one embodiment of the present invention, the system 20 checks for distortions in the aligned image 38 by comparing the locations of the vertices of the geometrical object 35 in relation to the second image 32 with defined or desired locations of the template reference points 36, which defined or desired points may be indicated by the user 22 of the system 20. This comparison of discrepancies produces an alignment status. The system 20 analyzes the degree and nature of any misalignment between locations of the vertices of the geometrical object 35 and defined locations of the template reference points 36 to reveal information about the degree and nature of any misalignment of an image generating device or system. Analyzing distortions allows the system 20 or the user 22 to analyze the alignment status of an image generation device.

C. EXAMPLE 3

Figure 6:
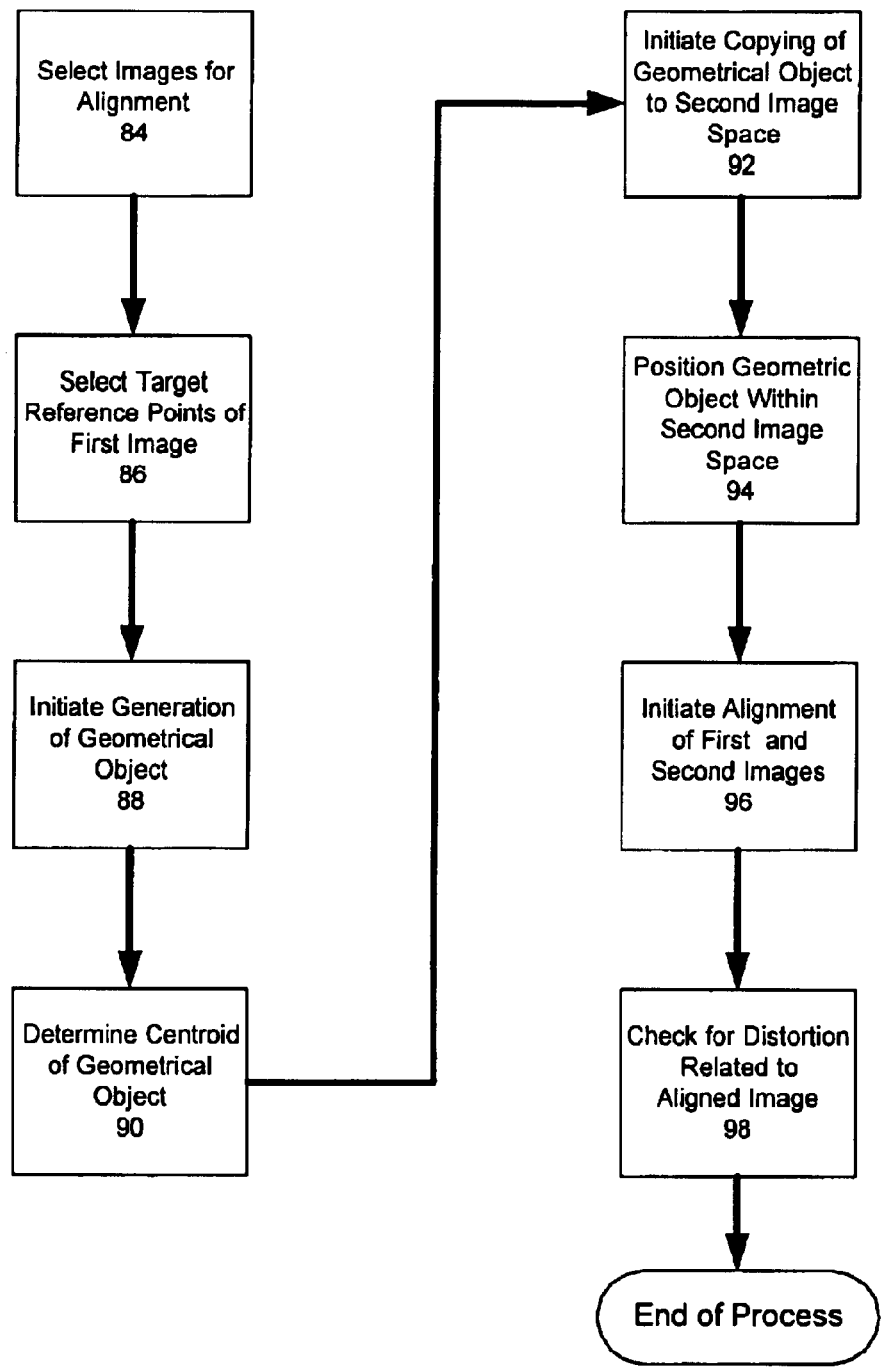
FIG. 6 is a flow diagram illustrating an example of steps that a user of an image alignment system may perform to generate an aligned image.

FIG. 6 is a flow diagram illustrating an example of steps that a user 22 of an image alignment system 20 can perform through an access device 24 and an interface 26 to generate an aligned image 38.

At 84, the user 22 selects or inputs images for alignment 84. The user 22 can provide images to the system 20 in any form recognizable by the system 20, including digital representations of images. The user 22 at 86 defines the target reference points 34 of a first image 30. The target reference points 34 can be defined by pointing and clicking on locations within the first image 30, by importing or selecting predefined target reference points 34, or by any other way understandable to the system 20.

The user 22 of the system 20 at 88 can initiate generation of the geometrical object 35. The geometrical object 35 can be initiated in a number of ways, including the defining the target reference points 34, defining a set number of the target reference points 34 that satisfy constraints, submitting a specific instruction to the system 20 to generate the geometrical object 35, or any other means by which the user 22 may signal the system 20 to generate the geometrical object 35. The system 20 can select an appropriate type of geometrical object 35 to generate, or the user 22 may select a type of geometrical object 35 to be generated. In one embodiment, the system 20 generates a geometrical object 35 by connecting the target reference points 34.

A user determines a centroid 104 of a geometrical object 35. In an alternative embodiment, the system 20 can determine and indicate the centroid 104 of the geometrical object 35. A determination of the centroid 104 is helpful for eliminating or at least mitigating errors that can occur in the image alignment system 20. By determining the centroid 104 of the geometrical object 35, the user 22 can verify that the centroid 104 is near the center of a critical area of the first image 30. If the system 20 or the user 22 of the system 20 determines that the centroid 104 of the geometrical object 35 is not near enough to a critical area of the first image 30 as is desired, the user 22 can redefine the target reference points 34.

The user 22 of the system 20 at 92 initiates a transfer or copy of the geometrical object 35 to the second image 32 space. The user 22 may signal the system 20 to transfer the geometrical object 35 in any way recognizable by the system 20. One such way is by sending an instruction to the system 20 for generation of the geometrical object 35 in the second image 32. Upon receipt of an appropriate signal, the system 20 transfers or copies the geometrical object 35 to the second image 32 space.

Once the geometrical object 35 is transferred to the second image 32 space, the user 22 positions the geometrical object 35 within the second image 32 space. The user 22 can use controls provided by the system 20 or that are a part of the system 20 to position the geometrical object 35. In one embodiment, the user 22 can shift the geometrical object 35 up, down, left, or right in relation to the second image 32, rotate the geometrical object 35 in relation to a second image 32, change the magnification or size of the geometrical object 35 in relation to the second image 32, move the geometrical object 35 through multiple dimensions, switch between coarse and fine positioning of the geometrical object 35, or execute any other control that can be used to adjust the geometrical object 35 in relation to the second image 32. The user 22 may use a thumbnail view or an accuracy metric to position the geometrical object 35.

The user 22 of the system 20 initiates alignment of the first image 30 and the second image 32. The user 22 may signal the system 20 to transfer the geometrical object 35 in any way recognizable by the system 20. One such way is to send an instruction for alignment to the system 20 via the access device 24 or the interface 26. Upon receipt of an alignment signal, the system 20 generates the aligned image 38 from the first image 30 and the second image 32.

At 98, the user 22 of the system 20 checks for distortion of the aligned image 38. In one embodiment, the user 22 determines and inputs to the system 20 desired locations of the template reference points 36 in relation to the second image 32. The system 20 can analyze the desired locations and post-alignment locations of template reference points 34 to discover information about any distortions in an aligned image 38. The system 20 may reveal to the user 22 any information pertaining to a distortion analysis.

V. Examples of Reference Points and Geometric Objects

Figure 7A:
FIG. 7A is a diagram illustrating one example of target reference points associated with a first image.
Figure 7B:
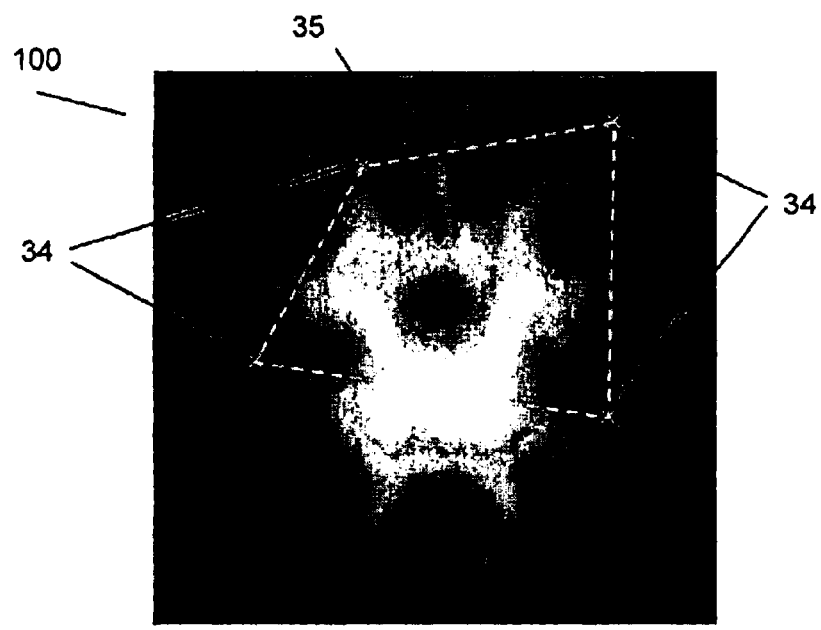
FIG. 7B is a diagram illustrating one example of a geometrical object connecting target reference points associated with a first image.
Figure 7C:
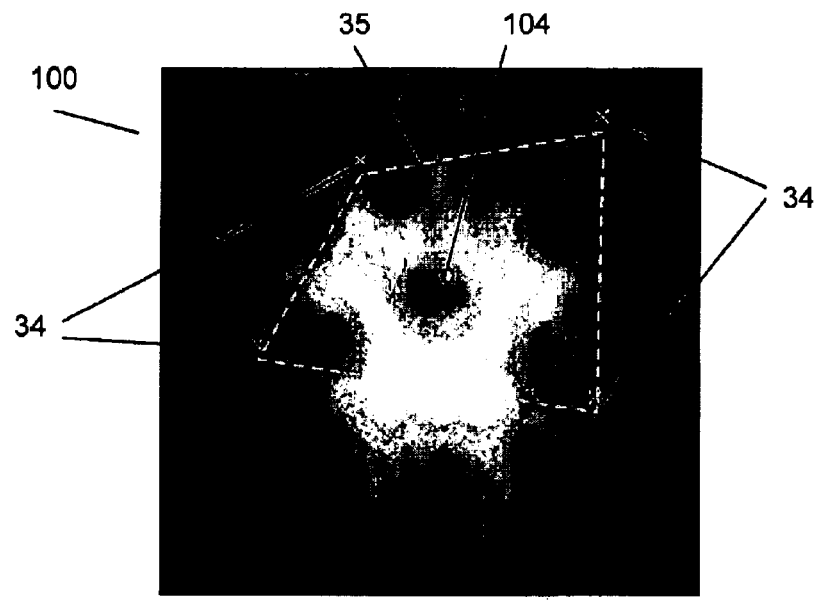
FIG. 7C is a diagram illustrating an example of a geometrical object and a centroid associated with that geometrical object.
Figure 7D:
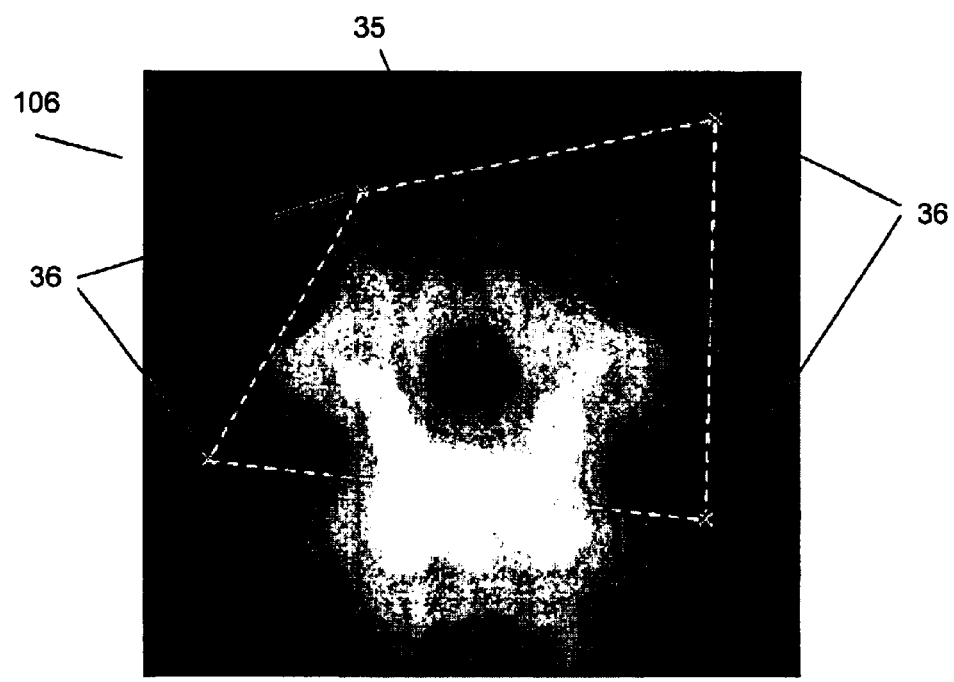
FIG. 7D is a diagram illustrating a geometrical object and various template reference points positioned in relation to a second image.

FIG. 7A illustrates the target reference points 34 defined in relation to the first image 32. FIG. 7B illustrates the geometrical object 35 connecting the target reference points 35. FIG. 7C illustrates an indication of the centroid 104 of the geometrical object 35. FIG. 7D illustrates a transferred geometrical object 35 and the template reference points 36 in relation to the second image 32.

FIG. 7A is a diagram illustrating one example of target reference points 34 defined in relation to the first image 32. FIG. 7B is a diagram illustrating one example of a geometrical object 35 connecting target reference points 34 associated with a first image 30. FIG. 7C is a diagram illustrating an example of a geometrical object 35 and a centroid 104 associated with that geometrical object 35. FIG. 7D is a diagram illustrating a transferred geometrical object 35 and various template reference points 36 positioned in relation to a second image 32.

VI. Alternative Embodiments

The above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in image alignment systems and methods, and that the invention will be incorporated into such future embodiments.

What is claimed is:

1. A system for aligning images, comprising:
  a definition subsystem comprising a first image, a second image, a plurality of target reference points, and a geometrical object configured in said definition subsystem, said geometrical object comprising a plurality of template reference points and a location;
  wherein said plurality of target reference points is associated with said first image;
  wherein said plurality of template reference points is associated with said second image; and
  wherein said definition subsystem is configured to identify said location;
  a combination subsystem comprising an aligned image, wherein said combination subsystem is configured to generate said aligned image from said first image, said second image, at least one of said target reference points, and at least one of said template reference points.

2. The system of claim 1, wherein said definition subsystem generates said geometrical object by connecting at least a subset of said target reference points.

3. The system of claim 1, wherein said definition subsystem imposes a constraint upon at least one of said target reference points.

4. The system of claim 1, wherein said definition subsystem identifies a characteristic of said geometrical object.

5. The system of claim 4, wherein said characteristic is a centroid.

6. The system of claim 1, wherein said definition subsystem generates said geometrical object in said second image.

7. The system of claim 6, wherein said definition subsystem provides a plurality of controls for positioning said geometrical object within said second image.

8. The system of claim 7, wherein said plurality of controls includes at least one control for shifting said geometrical object along a dimensional axis, rotating said geometrical object, and changing a magnification of said geometrical object.

9. The system of claim 7, wherein said plurality of controls includes a coarse position control and a fine position control.

10. The system of claim 7, wherein said definition subsystem adjusts said geometrical object in relation to said second image.

11. The system of claim 1, wherein said definition subsystem provides a thumbnail image of said geometrical object.

12. The system of claim 1, wherein said definition subsystem identifies a plurality of positions of said geometrical object in relation to said second image, said plurality of positions including a gross position and a fine position.

13. The system of claim 12, wherein said plurality of positions is identified in a substantially similar manner.

14. The system of claim 1, wherein said definition subsystem provides an accuracy metric related to at least one of said template reference points.

15. The system of claim 1, further comprising an interface subsystem, wherein said interface subsystem indicates a relative position of said geometrical object within said second image.

16. The system of claim 1, wherein said combination subsystem accesses said target reference points and said template reference points from said definition subsystem.

17. The system of claim 1, wherein said combination subsystem generates an alignment calculation.

18. The system of claim 1, wherein said aligned image is generated from a plurality of images.

19. The system of claim 1, further comprising a detection subsystem configured to detect distortions relating to said aligned image.

20. The system of claim 1, wherein said target reference points are selected through an interface subsystem.

21. An apparatus for aligning images, comprising:
  a computer program tangibly embodied on a computer-readable medium, said computer program including:
  a plurality of target reference points associated with a first image;
  a geometrical shape generated by connecting at least a subset of said target reference points;
  a second image configured to include said geometrical shape, wherein said computer program provides for identifying a plurality of template reference points by positioning said geometrical shape in relation to said second image;
  a third image created from said firs image, said second image, and a relationship between said target reference points and said template reference points; and
  an interface configured to receive input, wherein said input includes an instruction for defining said plurality of target reference points and a command for positioning said geometrical shape in relation to said second image.

22. The apparatus of claim 21, wherein said computer program imposes a constraint upon said target reference points.

23. The apparatus of claim 21, wherein said computer program identifies a feature of said geometrical shape.

24. The apparatus of claim 23, wherein said feature is a centroid.

25. The apparatus of claim 21, wherein positioning said geometrical shape includes at least one of shifting said geometrical shape along a dimensional axis, rotating said geometrical shape, and changing a magnification of said geometrical shape.

26. The apparatus of claim 21, wherein positioning said geometrical shape includes a coarse adjustment and a fine adjustment of said geometrical shape.

27. The apparatus of claim 21, wherein said computer program provides a thumbnail image of an area adjacent to a vertex of said geometrical shape.

28. The apparatus of claim 21, wherein said computer program identifies a gross position and a fine position of said geometrical shape in relation to said second image, and wherein said gross position and said fine position are identified in a substantially simultaneous manner.

29. The apparatus of claim 21, wherein said computer program provides an accuracy metric related to at least one of said template reference points.

30. The apparatus of claim 21, wherein said computer program requires more than four template reference points.

31. The apparatus of claim 21, wherein said geometrical shape is not a polygon.

32. The apparatus of claim 21, wherein said computer program generates an alignment calculation.

33. The apparatus of claim 21, wherein said computer program is configured to detect distortions of said third image.

34. The apparatus of claim 21, said computer program including a plurality of controls, said plurality of controls including a shift control, a rotation control, and a magnification control.

35. The apparatus of claim 34, wherein each control in said plurality of controls functions in a plurality of modes, said plurality of modes including a coarse mode and a fine mode.

36. A method far aligning images, comprising:
receiving an input for defining target reference points associated with a first image;
generating a geometrical object by connecting at leant four said target reference points;
identifying template reference points based on a placement of said geometrical object in relation to said second image; and
producing an aligned image front said first image, said second image, and a relationship between at least one of said target reference points in said first image and at least one of said template reference points in said second image.

37. The method of claim 36, further comprising imposing a constraint on said target reference points.

38. The method of claim 36, wherein said input includes a command.

39. The method of claim 38, wherein said command allows for at least one of shifting said geometrical object along a dimensional axis, rotating said geometrical object, and adjusting a magnification of said geometrical object.

40. The method of claim 38, wherein said command allows for coarse adjustments and fine adjustments of said geometrical object.

41. The method of claim 36, further comprising calculating a plurality of accuracy metrics.

42. The method of claim 36, further comprising displaying said geometrical object as one of a solid object, a semi-transparent object, and a transparent object.

43. The method of claim 36, further comprising displaying a thumbnail image of an area proximate to at least one of said template reference points.

44. The method of claim 43, wherein said thumbnail image is configured to allow for a substantially simultaneous display of fine positioning detail and coarse positioning detail.

45. The method of claim 36, further comprising providing an accuracy measurement detail for at least one of said template reference points or for a composite of said template reference points.

46. The method of claim 43, further comprising analyzing an alignment status of an image generation device, wherein said alignment status is determined from a discrepancy between said accuracy measurement detail and defined locations for said template reference points.

47. The method of claim 36, further comprising adjusting said positioning of said geometrical object within said second image.

48. A method for aligning radiographic images, comprising:
facilitating a positioning of a template image comprising a first set of reference points in relation to an object image comprising a second set of reference points by relating at least one point in the first set of reference points to at least one point in the second set of points; and
generating an aligned image from a target image and said object image according to said positioning of said template image in relation to said object image.

49. The method of claim 48, wherein said positioning is facilitated by providing controls for said positioning of said reference image in relation to said object image.

* * * * *

UNITED STATES PATENT AND TRADEMARK OFFICE
CERTIFICATE OF CORRECTION

PATENT NO. : 6,937,751 B2
DATED : August 30, 2005
INVENTOR(S) : Daniel M. Ritt et al.

It is certified that error appears in the above-identified patent and that said Letters Patent is hereby corrected as shown below:

Column 14,
Line 50, change "firs" to -- first --.

Column 15,
Line 34, change "far" to -- for --.
Line 37, change "leant" to -- least --.
Line 42, change "front" to -- from --.

Signed and Sealed this

Sixteenth Day of May, 2006

JON W. DUDAS
*Director of the United States Patent and Trademark Office*